(12) United States Patent
Matsushita

(10) Patent No.: US 6,425,102 B1
(45) Date of Patent: Jul. 23, 2002

(54) DIGITAL SIGNAL PROCESSOR WITH HALT STATE CHECKING DURING SELF-TEST

(75) Inventor: Yoshinori Matsushita, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/337,291

(22) Filed: Jun. 21, 1999

(30) Foreign Application Priority Data

Jun. 19, 1998 (JP) .......................................... 10-172431

(51) Int. Cl.[7] ............................................... G06F 11/30
(52) U.S. Cl. ............................ 714/733; 714/30; 714/34
(58) Field of Search .............................. 714/21, 34, 10, 714/51, 55, 733, 30, 49; 712/35, 36

(56) References Cited

U.S. PATENT DOCUMENTS

| | | | | |
|---|---|---|---|---|
| 4,072,852 A | * | 2/1978 | Hogan et al. ................... 714/15 |
| 4,118,792 A | * | 10/1978 | Struger et al. ................. 714/43 |
| 4,312,066 A | * | 1/1982 | Bantz et al. ................... 714/30 |
| 4,538,273 A | * | 8/1985 | Lasser ......................... 714/23 |
| 4,639,918 A | * | 1/1987 | Linkowski ..................... 714/30 |
| 4,956,807 A | * | 9/1990 | Hosaka et al. ................. 714/55 |
| 5,006,989 A | * | 4/1991 | Parker ......................... 701/20 |
| 5,381,420 A | * | 1/1995 | Henry ......................... 714/731 |
| 5,410,686 A | * | 4/1995 | Kish .......................... 714/30 |
| 5,530,804 A | * | 6/1996 | Edgington et al. ............. 714/30 |
| 5,838,897 A | * | 11/1998 | Bluhm et al. ................. 714/30 |
| 5,867,658 A | * | 2/1999 | Lee ........................... 709/222 |
| 6,012,155 A | * | 1/2000 | Beausang et al. .............. 714/727 |
| 6,081,885 A | * | 6/2000 | Deao et al. .................. 712/220 |
| 6,112,312 A | * | 8/2000 | Parker et al. ................. 714/32 |
| 6,175,913 B1 | * | 1/2001 | Chesters et al. .............. 712/227 |

OTHER PUBLICATIONS

Hamilton, Charles. "Watchdog timer reboots PCs" <http://proquest.umi.com/pqdweb?Did=0000000122889&Fmt×4&Deli×1&Mtd×1&Id××9&Sid×4&RQT×309> [accessed 21 Nov. 2001].*

"Checkstop-on-Stop Capability for Multiprocessor Debug", IBM Technical Disclosure Bulletin, Apr. 1994, US, vol. 37, issue 4B, pp. 455–456.*

* cited by examiner

Primary Examiner—Robert Beausoleil
Assistant Examiner—Gabriel Chu
(74) Attorney, Agent, or Firm—Gerald E. Laws; W. James Brady, III; Frederick J. Telecky, Jr.

(57) ABSTRACT

The objective of the invention is to provide a DSP that can perform hold testing, which evaluates the halt state of the DSP core, during DSP core self-testing. DSP circuit 2 has input scheduler 8 that outputs restart signals to halt terminal HALT, which controls operation halt/restart for the of DSP core 4, when a fixed time has elapsed after operation of DSP core 4 has halted during hold testing, so the stopped DSP core 4 can be restarted. Thus, the internal state of DSP core 4 when operation restarts, can be recognized by the DSP core 4 itself, so it will be possible to implement hold testing that evaluates whether or not the DSP core 4 has correctly halted operation.

7 Claims, 2 Drawing Sheets

DIGITAL SIGNAL PROCESSOR WITH HALT STATE CHECKING DURING SELF-TEST

FIELD OF THE INVENTION

The present invention pertains to a digital signal processor (hereafter called DSP) that is a processor specifically developed for high-speed digital signal processing of grouped digital signals, and in particular, it pertains to an improvement in DSP operation testing.

BACKGROUND OF THE INVENTION

Conventional DSPs are explained below. In FIG. 3, symbol 101 is a conventional DSP. This DSP 101 has external input terminals 111–113, DSP circuit 102, interface circuit 103, and external output terminals 131–133. This DSP 101 is constituted so that when external input terminals 111–113 are connected to the output terminal of an external device, such as a digital modem, and external output terminals 131–133 are connected to the input terminal of an external device, signals output by an external device are input into interface circuit 103 and signals that are output from interface circuit 103 can be input into an external device via external output terminals 131–133. Note that in FIG. 3 only external input terminals 111–113 and external output terminals 131–133 are shown, but more external input terminals and external output terminals can be provided.

Interface circuit 103 is a circuit that converts input signals into a form that can be processed by DSP circuit 102. In normal operation, signals are input into DSP circuit 102 after conversion, and after arithmetic processing is performed by the DSP core 104 in DSP circuit 102, they are output to interface circuit 103.

Then interface circuit 103 converts the arithmetically processed results input from DSP circuit 102 and outputs them to an external device via external output terminals 131–133, and therefore the entire DSP 101 is able to control the external device.

As an example of a case where operation testing is performed before a DSP 101 such as this is installed, instead of an external device, a tester, which is not shown, is connected to external input terminals 111–113 and to external output terminals 131–133, specific signals are input from this ester to external input terminals 111–113, and signals output from external output terminals 131–133 are read by the tester. By determining if the output signals agree with predetermined specifications, it can be determined whether DSP 101 is operating correctly.

However, there are problems with the aforementioned operation testing of DSP 101. Specifically, signals are transmitted via interface circuit 103, so even if it is determined that the operation of DSP 101 is abnormal, it is impossible to determine whether this is due to a faulty DSP circuit 102 or due to a faulty interface circuit 103, and since DSP circuit 102 cannot be coupled directly to the tester, the operation of DSP circuit 102 alone cannot be tested.

So, self-testing, in which the DSP circuit 102 tests its own operation by producing test data inside the DSP circuit 102, bypassing interface circuit 103, has been proposed.

In order to execute this self-testing, data transfer circuit 105, memory 106, data hold circuit 107, and multiplexer 120 are provided for DSP circuit 102.

With self-testing, during test setup, test programs, and setting information required for test data production are written to memory 106 from DSP core 104. After this, when test execution has started, test programs, setting information, etc. are supplied to DSP core 104 from memory 106.

Next, test data and control instructions with the same specifications as data input to DSP core 104 during normal operation are produced by DSP core 104 based on the test programs and output to data transfer circuit 105. Test data and control instructions are output to multiplexer 120 from each data line $L_{111}$ and $L_{112}$ in data line group 140 from data transfer circuit 105.

Multiplexer 120, during actual operation, connects output signal line group 150 of interface circuit 103 to DSP core 104, but during test operations it connects data line group 140 to DSP core 104 based on control instructions output from DSP core 104. Consequently, the test data generated by data transfer circuit 105 are input to input terminals IN1 and IN2 of the DSP core.

Input test data are arithmetically processed by DSP core 104 and the results of the arithmetic processing are output to data line group 160 from output terminals $T_1$ and $T_2$. The arithmetic processing results output to data line group 160 are held by data hold circuit 107 and output in a specific order to input terminal TDI on DSP core 104. Finally the output is re-input to DSP core 104.

The arithmetic processing results input to input terminal TDI are compared with the correct arithmetic processing results already held in DSP core 104 and it is determined whether the arithmetic processing that was performed was correct or not. After this, new test data are produced by DSP core 104, and the sequence of arithmetic processing and evaluation processing discussed above is repeated the exact number of predetermined times. When all the executed arithmetic processing results equal the correct arithmetic processing results, the DSP circuit 102 is judged to be good by the DSP core 104 itself. Then, by outputting the results of this evaluation from data line $L_r$ to an external circuit, which is not shown, self-testing is completed.

In this way, self-testing has the advantage that the DSP circuit 102 can be tested while bypassing interface circuit 103, so it is possible to test only the DSP circuit 102, which would have been impossible with operation testing using a tester.

Also, there is a halt terminal HALT, which is an operation halt/continue control terminal for DSP core 104, in DSP core 104, and there is a test that determines whether the operation of DSP 101 can be halted normally by means of halt terminal HALT (hereafter called hold testing).

When hold testing is performed by self-testing, halt terminal HALT and data transfer circuit 105 are connected via multiplexer 120, DSP core 104 outputs a halt signal via data transfer circuit 105, and the halt signal is input to halt terminal HALT. When a stop signal is input to halt terminal HALT, the operation of DSP core 104 itself is halted. The result is that not only is it impossible for the DSP core 104 itself to determine whether the halt state is good, but processing cannot be restarted.

The present invention was created to solve problems such as these in the prior art. Its objective is to provide a digital signal processor DSP, which allows core self-testing, and after the core itself has been halted, it can be determined whether the core's halt state is good by restarting the core.

SUMMARY OF THE INVENTION

In order to solve the aforementioned problems, the digital signal processor described therefor herein is constituted by having a processor for processing digital signals, a memory that holds data for self-testing of the aforementioned processor, a data transfer circuit into which are input self-test control data, which are output by the aforementioned processor for the processor and that supplies the relevant self-test control data to the aforementioned processor, an operation controller into which control signals are input from the aforementioned processor and that supplies operation control signals to the aforementioned processor after a specified time has elapsed, a first switching circuit that is installed between an external input terminal, the aforementioned data transfer circuit and a data input terminal of the aforementioned processor and that selects data supplied from either the aforementioned external input terminal or the aforementioned data transfer circuit and outputs the data to the aforementioned data input terminal, and a second switching circuit that is installed between the aforementioned input terminal, a halt terminal of the aforementioned processor, aforementioned data transfer circuit, and the aforementioned operation control circuit, and that selects one of the signals supplied from the aforementioned external input terminal, the aforementioned data transfer circuit, or the aforementioned operation control circuit and outputs the signal to the aforementioned halt terminal. When the aforementioned processor inputs signals, which indicate to halt the operation of the processor, to the aforementioned halt terminal via the aforementioned data transfer circuit and the aforementioned second switching circuit during self testing, the aforementioned operation control circuit outputs the aforementioned operation control signals to the aforementioned halt terminal via the aforementioned second switching circuit after a specified time has elapsed in response to the aforementioned control signals output from the aforementioned processor, and the aforementioned processor is returned to an operating state.

In addition, the digital signal processor is a digital signal processor described in claim 1, and therefor may have a data hold circuit that holds self-test result information based on the aforementioned self-testing control data output from the aforementioned processor.

Additionally, the digital signal processor of therefor may output digital signal processor described in claim 2, and the aforementioned processor outputs internal state information to the aforementioned data hold circuit describing the halt state during self-testing after operation restarts in response to the aforementioned operation control signals output from the aforementioned operation controller.

In addition, the digital signal processor described in claim 4 is a digital signal processor described in claim 2 or 3, where the aforementioned therefor may receive input of self-test result information output from the aforementioned data hold circuit and compares the self-test result information with expected test results and outputs the comparison results of the outside.

Additionally, the digital signal processor of is a digital signal processor described in claim 1, therefor may and has an interface circuit that serves as an interface between the aforementioned processor and the outside.

With the digital signal processor of the present invention, in the hold (halt operation) self-test, even when the operation of the core halts due to the output of a halt signal by the core (processor) to itself, the operation of the core can be restarted by subsequent input of operation control signals from the operation control circuit to the halt terminal. For this reason, unlike in the past, when it would not have been possible to confirm the core's halt state because the core could not be restarted after being halted, it is now possible to implement a hold test that can determine a good or bad core halt state.

Note that, with the present invention, after core operation halts by the input of a halt operation signal from the core to the halt terminal, the time until operation control signals are output to the halt terminal can be adjusted based on data strings, etc. By this configuration, the core operation halt time can be adjusted, so it is possible to conduct core hold testing for various halt times.

In addition, with the present invention, self-test result signals that indicate the results of self-testing, are compared with self-test results of anticipated self-testing and the comparison results are output to the outside, so whether or not the core is good can be confirmed easily on the outside.

In the figures, 1 represents a DSP (digital signal processor), 2 represents a DSP circuit, 3 represents a interface circuit, 4 represents a DSP core (core), 5 represents a data transfer circuit, 6 represents a memory, 7 represents a data hold circuit, 8 represents a input scheduler (operation control circuit,) 23 represents a selection switch (switching circuit), IN1, IN2 represents a input terminal (data input terminal) $T_1$, $T_2$ represents a output terminal (data output terminal), and HALT represents a halt terminal (control input terminal).

DESCRIPTION OF THE EMBODIMENT

Figure 1:
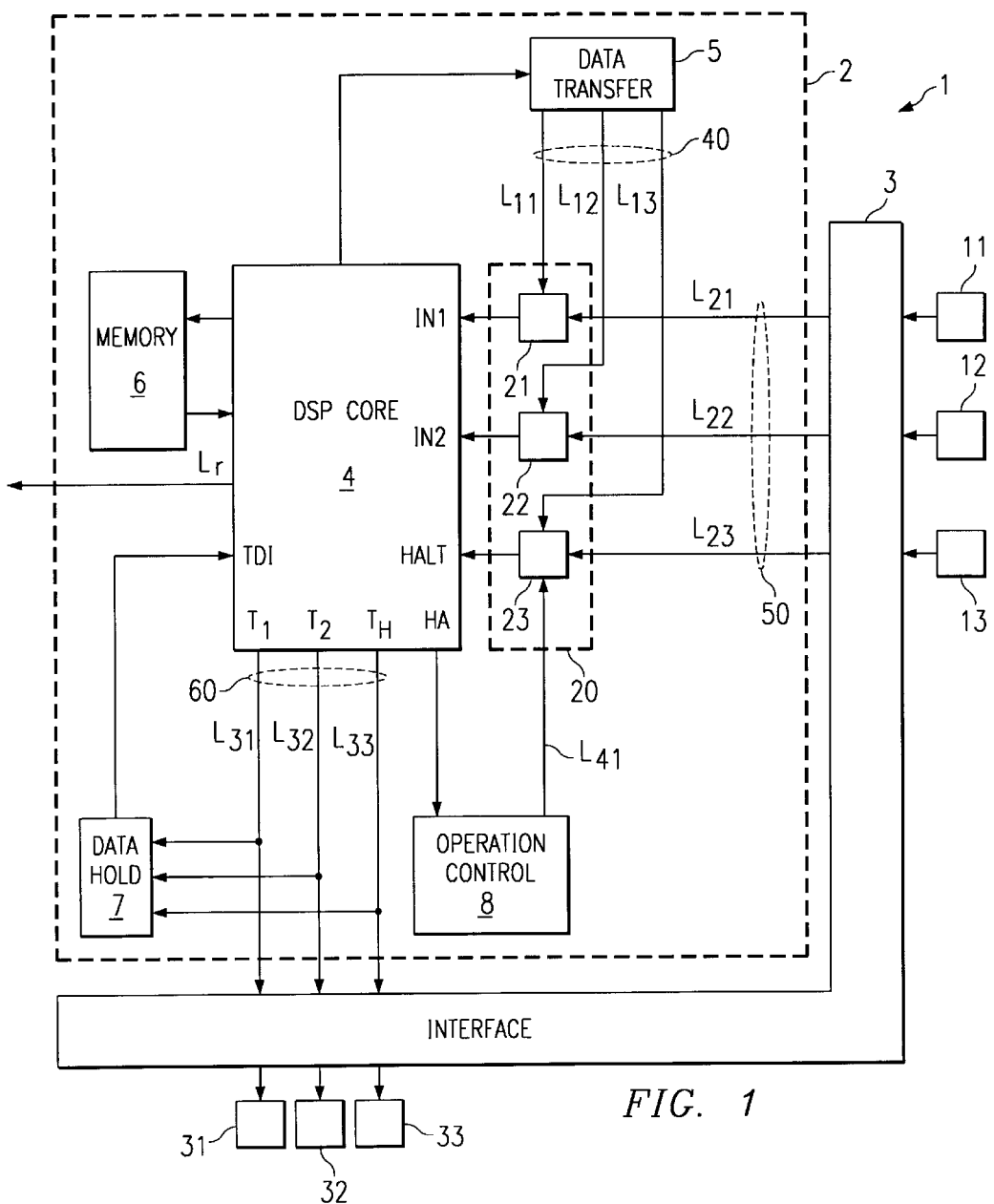
FIG. 1 is a structural diagram of a digital signal processor in a preferred embodiment of the present invention.

Below, this preferred embodiment of a DSP is explained. In FIG. 1, symbol 1 represents this preferred embodiment of a DSP. This DSP 1 has external input terminal 11–13, DSP circuit 2, interface circuit 3, and external output terminals 31–33. Here, in FIG. 1, only external input terminals 11–13 and external output terminals 31–33 are shown, but more external input terminals and external output terminals can be provided.

DSP circuit 2 includes DSP core 4 and multiplexer 2C. This multiplexer 20 has selection switches 21–23.

External input terminals 11–13 are connected to interface circuit 3. Interface circuit 3 and multiplexer 20 are connected by data line group 50. Selection switches 21, 22 and 23 of multiplexer 20 are connected to input terminals (IN1 and (IN2 and halt terminal HALT of DSP core 4, respectively. Output terminals $T_1$, $T_2$, and $T_H$ of DSP core 4 are connected with interface circuit 3 by data line group 60, and interface circuit 3 and external output terminals 31–33 are connected.

With DSP 1 as described above, in normal operation, external input terminals 11 and 12, external output terminals 31 and 32, and the output terminals and input terminals of an external device, such as a modem, that is not shown, are each connected, and a specific signal is output from the output terminals of the external device to external input terminals 11 and 12 and input to interface circuit 3. After this signal is converted into a form that DSP circuit 2 can process by interface circuit 3, it is output to selection switches 21 and 22 via data lines $L_{21}$ and $L_{22}$ of data line group 50. In normal operation, selection switches 21 and 22 are switched so that each input terminal IN1 and IN2 and data line $L_{21}$ and $L_{22}$ are connected, so signals in each data line $L_{21}$ and $L_{22}$ are input to input terminals IN1 and IN2, respectively.

Then, after specific arithmetic processing has been performed by DSP core 4 for signals input to input terminals IN1 and IN2, they are input to data lines $L_{31}$ and $L_{32}$ of data line group 60 from output terminals $T_1$ and $T_2$ and input to interface circuit 3. Signals input to interface circuit 3 are converted to a form required to drive the external device by interface circuit 3 and are output to an input terminal of the external device, not shown, via external output terminals 31 and 32. As a result of this, the external device is controlled by the entire DSP 1.

In order to perform a self-test of only the DSP circuit 2 of DSP 1 as described above, DSP 1 in this preferred embodiment, has, in addition to the configuration discussed above, data transfer circuit 5, memory 6, and data hold circuit 7.

The input side of data transfer circuit 5 is connected with DSP core 4 and the output side is connected with multiplexer 20 via data line group 40. In addition, memory 6 is connected to enable input and output with DSP core 4. Additionally, the input side of data hold circuit 7 is connected with data line group 60 and the output side is connected with input terminal TDI of DSP core 4.

To execute self-testing with a DSP 1 of this constitution, during test setup, test programs and setting information required for producing test data are written to memory 6 via DSP core 4. After this, when execution of self-testing is started, test programs, all setting information, etc., are read from memory 6 into DSP core 4.

Next, test data with the same specifications as data input to DSP core 4 during normal operation are produced and output to data transfer circuit 5 based on the test programs, etc.

Then, test data and multiplexer 20 control instructions are output from data transfer circuit 5 to selection switches 21 and 22 of multiplexer 20 via each data line $L_{11}$ and $L_{12}$, respectively, in data line group 40.

Selection switches 21 and 22, during normal operation, are switched so that each data line $L_{21}$ and $L_{22}$ is connected to input terminals IN1 and IN2, respectively, but during self-testing, they are switched according to control instructions output from data transfer circuit 5 so that each data line $L_{11}$ and $L_{12}$ is connected to input terminals IN1 and IN2, respectively.

Test data input from input terminals IN1 and IN2 undergo specific arithmetic processing by DSP core 4 and the results of this arithmetic processing are output from output terminals T1 and T2 to data lines $L_{31}$ and $L_{32}$ of data line group 60. Thus, the arithmetic processing results output to data lines $L_{31}$ and $L_{32}$ are returned to DSP core 4 via input terminal TDI, which collects output results of DSP core 4, after being temporarily held by data hold circuit 7.

Executed arithmetic processing results that are input into input terminal TDI are compared with correct arithmetic processing results already stored in DSP core 4 and it is determined whether the actual arithmetic processing was correct or not. After this, the sequence of arithmetic processing and evaluation processing discussed above is repeated the exact number of predetermined times. Then these evaluation results are output to an external circuit, not shown, through data line $L_r$ to complete self-testing. By self-testing in this way, it becomes possible to test the operation of only DSP circuit 2.

Then, in order to perform hold testing, which has a step in which the operation of DSP core 4 is halted during self-testing of DSP 1 of this preferred embodiment described above, DSP 1 of this preferred embodiment is provided with halt terminal HALT, which controls the halting and restarting of DSP core 4 itself, on DSP core 4. The core is constituted so that when a halt signal is input from external input terminal 13 via interface circuit 3 to this halt terminal HALT, the operation of DSP core 4 will halt, and when a restart signal is input to halt terminal HALT in this state, DSP core 4 will begin operating again. Additionally, multiplexer 20 is provided with selection switch 23 that is connected to halt terminal HALT.

In addition, DSP 1 is provided with input scheduler 8, and the output side of this input scheduler 8 and selection switch 23 are connected via data line $L_{41}$.

Figure 2:
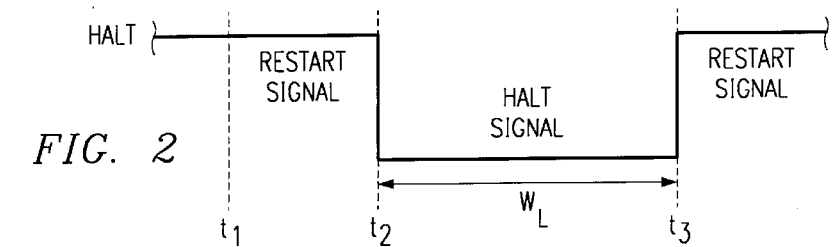
FIG. 2 is a diagram explaining the state of signals input to a halt terminal in this preferred embodiment.

Referring to the timing chart for signals input to halt terminal HALT shown in FIG. 2, the aforementioned hold test performed by DSP 1 is explained.

First, during test setup, in addition to test programs and all setting information, certain specifications relating to the internal state of the DSP core 4 for restarting the core after an operation halt are written beforehand to memory 6 from DSP core 4.

Next, at test start time (time $t_1$ in FIG. 2) setting information, e.g., test programs, are read into DSP core 4 from memory 6, test data are produced by DSP core 4, and test data, control instructions, and halt/continue signals are output to data transfer circuit 5. Test data output from DSP core 4 are output to data lines $L_{11}$ and $L_{12}$ of data line group 40 from data transfer circuit 5 and halt/continue signals are output to data line $L_{13}$.

Selection switches 21–23, during normal operation, are switched so that each data line $L_{21}$–$L_{23}$ is connected to input terminals IN1 and IN2 and halt terminal HALT, respectively, but at test start time $t_1$, they are switched so that each data line $L_{11}$–$L_{13}$ is connected to input terminals IN1 and IN2 and halt terminal HALT, respectively, based on control instructions output from data transfer circuit 5.

Next, DSP core 4 performs specific arithmetic processing for test data input from input terminals IN1 and IN2 and outputs processed data to output terminals $T_1$ and $T_2$. After arithmetic processing such as this is performed several times, when the operation of DSP core 4 is intended to be halted at a specific time (time $t_2$), a halt signal is output from DSP core 4 via data transfer circuit 5 to data line L13 at that time $t_2$. This halt signal is output to selection switch 23. Selection switch 23 maintains a connection state between data line L13 and halt terminal HALT at time $t_2$, so the halt signal is input to halt terminal HALT and the operation of DSP core 4 is halted.

At time $t_2$, a control instruction of a restart countdown signal is output to scheduler 8 from output terminal HA of DSP core 4. When this control instruction is output, input scheduler 8 starts counting clock pulses output from a quartz oscillator, not shown, to which it is connected.

Figure 3:
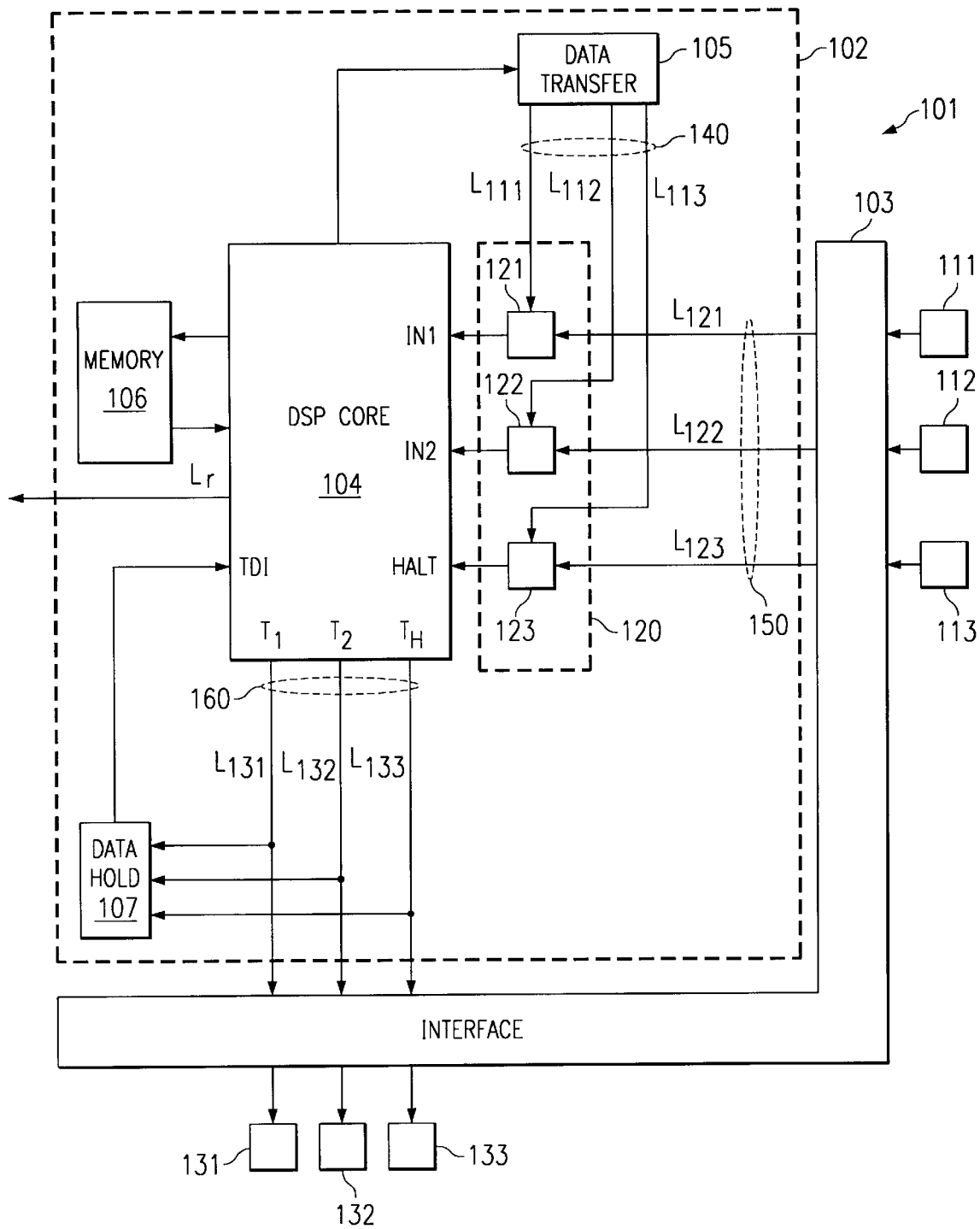
FIG. 3 is a structural diagram of a conventional prior art digital signal processor.

Then, after clock counting is started, when a specific number of clock pulses has been counted, at that time (time $t_3$ in FIG. 3, input scheduler 8 outputs a restart signal and selection switch 23 control instruction are output to selection switch 23 via data line $L_{41}$. This specific number of clock pulses is determined by a data string stored in a dedicated register, not shown, that is connected to input scheduler 8. With this preferred embodiment, an output signal and control instruction are output when the 15th clock pulse is counted, starting from time $t_2$.

When a control instruction is output from input scheduler 8, selection switch 23 is switched according to this control instruction so that data line $L_{41}$ is connected with halt terminal HALT. By doing this, restart signals output to data line L41 are input to halt terminal HALT and DSP core 4 restarts operation.

After operation restarts, data indicating the internal state of DSP core 4 when operation restarts are produced and output to data lines $L_{31}$ and $L_{32}$ of data line group 60 from each output terminal $T_1$ and $T_2$. This data (hereafter called output result data) is input to DSP core 4 from input terminal TDI after being temporarily held in data hold circuit 7.

Then DSP core 4 reads specifications inside DSP core 4 at restarting after operation halt from memory 6 and compares them with the output result data, determines whether the internal state during operation halt of DSP core 4 agrees with the specific specifications, and determines whether or not the halt state was normal. After this, DSP core 4 outputs these evaluation results to an external circuit, not shown, from data line L to end testing.

As explained above, with DSP 1 of this preferred embodiment, operation continues even when operation of DSP core 4 is halted, and input scheduler 8, that outputs a restart signal to halt terminal HALT at time $t_3$ after a fixed time has elapsed from time $t_2$, which is when DSP core 4 halts operation, so operation of DSP core 4, that has halted during self-testing, can be restarted.

Thus, after operation restarts, DSP core 4 can itself determine the internal state after operation restarts, and it can be evaluated whether or not this internal state is normal, so it is possible to implement a hold test, that could not be implemented with a conventional DSP.

Note that, with this preferred embodiment, using a quartz oscillator, not shown, input scheduler 8 counts clock pulses that the quartz oscillator produces and the timing at which restart signals are output is determined based on this count, but the present invention is not limited to this. It could be constituted so that restart signals are output by any means after a specific time has elapsed after the operation of DSP core 4 has halted.

In addition, with this preferred embodiment, the time from time $t_2$, at which the operation of DSP core 4 halts, until time $t_3$ (hereafter called operation halt time $W_L$) is set to be the time in which 15 clock pulses are output from the quartz oscillator, but the present invention is not limited to this. Operation halt time $W_L$ can be adjusted by changing the data string stored in a dedicated register and it can be set in any way according to the test contents. Thus, it will be possible to execute hold testing while changing DSP core 4 halt time in various ways.

Additionally, with this preferred embodiment, multiplexer 20 is provided, and either data line group 50, which transmits signals from outside of DSP circuit 2, or data line group 40, which transmits signals from DSP core 4, is connected to input terminals IN1 and IN2 and halt terminal HALT, but the present invention is not limited to this. It could be constituted so that signals can be input from either outside of DSP circuit 2 or DSP core 4 to input terminals IN1 and IN2 and halt terminal HALT.

In addition, data input and output between DSP core 4 and data transfer circuit 5, memory 6, data hold circuit 7, and input scheduler 8 could be serial or could be parallel.

With the digital signal processor of the present invention, self-testing with a step where core operation halts can be implemented.

In addition, the time for which core operation halts during self-testing can be set arbitrarily, so it will be possible to perform hold testing corresponding to a variety of test conditions.

What is claimed is:

1. Digital signal processor comprising:
   a processor for processing digital signals;
   a memory that holds data for self-testing the processor;
   a data transfer circuit connected to receive self-test control data output by the processor;
   a data hold circuit connected to receive self-test result information output from the processor;
   an operation controller connected to receive control signals from the processor, and having an output for providing a restart signal after a specified time has elapsed;
   a first switching circuit with inputs connected to a first external input terminal and the data transfer circuit and an output connected to a data input terminal of the processor, for selecting either data from the first external input terminal or self-test control data from the data transfer circuit; and
   a second switching circuit with inputs connected to receive signals from a second external input terminal, the data transfer circuit, and the operation controller and having an output connected to a halt terminal of the processor, wherein during self-test, the processor is operable to halt in response to a halt signal selected by the second switching circuit from the data transfer circuit responsive to the self-test control data output by the processor, and to resume operation after the specified time has elapsed in response to the restart signal selected by the second switching circuit from the operation controller; and
   wherein the processor provides internal state information during self-testing to the data hold circuit and provides halt state information after resuming operation in response to the restart signal.

2. Digital signal processor of claim 1 wherein the processor receives input of self-test result information output from the data hold circuit and compares said self-test result information with expected self-test results and provides said comparison results outside the digital signal processor.

3. Digital signal processor of claim 1, further comprising an interface circuit that serves as an interface between the processor and external circuits.

4. The digital signal processor of claim 1, wherein the operation controller has a control instruction output connected to the second switching circuit, such that the second switching circuit is operable to select the restart signal from the operation controller in response to the control instruction output.

5. A method for self-testing a processor, comprising the steps of:
   performing arithmetic processing of test data to produce result data;
   comparing the result data to expected result data to determine if the arithmetic processing was performed normally;
   starting a timer that will produce a restart signal after a specified time has elapsed;
   asserting a halt signal to cause the processor to enter a halt state;
   resuming operation in response to the restart signal after the specified time has elapsed; and
   providing halt state information after resuming operation in response to the restart signal.

6. The method of claim 5, further comprising the step of comparing the halt state information with a set of specifications to determine if the halt state was normal.

7. The method of claim 6, further comprising the step of providing an external indication of normal or abnormal operation responsive to the steps of comparing.

* * * * *